United States Patent Office 3,793,458
Patented Feb. 19, 1974

---

3,793,458
METHODS FOR TREATING DUODENAL ULCERS
Camille Georges Wermuth, Strasbourg, and Jean Cahn, Paris, France, and Eugene Rottenberg, Saint Gallen, Switzerland, assignors to Socibre, Nanterre, France
No Drawing. Filed Aug. 14, 1970, Ser. No. 63,929
Claims priority, application France, Aug. 14, 1969, 6928098
Int. Cl. A61k 27/00
U.S. Cl. 424—317  4 Claims

ABSTRACT OF THE DISCLOSURE

The substances belong to the family of monoamides of cyclic diacids of the formula:

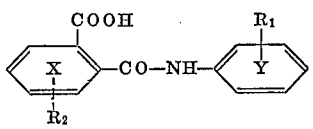

in which the groups

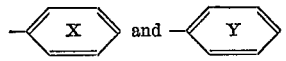

each represent a phenyl or pyridinyl nucleus; $R_1$ and $R_2$ each represent at least one halogen, lower alkyl, halogenyl alkyl, acyl, hydroxyl, alkoxyl, acyloxy, thioalkoxy, sulfone, amino or nitro substituent at any positions on the corresponding nuclei. They are produced by reacting the internal anhydride of phthalic or quinolinic acid with aniline or the corresponding substituted aniline.

---

The invention relates to new medicaments constituted by monoamides of cyclic diacids, especially of phthalic acid, as well as to direct derivatives of these substances or to compositions capable of liberating them, these substances having anti-inflammatory, analgesic and—at least for certain among them—antiulcerigenic properties, making them particularly suitable for application in human and veterinary therapeutics.

The anti-inflammatory substances according to the invention are characterized by the presence simultaneously on a same aromatic nucleus, of a side chain bearing an acid function and a carbonyl group included in an amide function, one of the substituents borne by the nitrogen atom of the latter being of the anilide type, preferably substituted.

These substances can especially be represented by the following general formula:

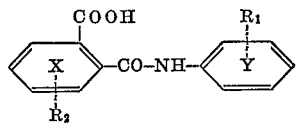

in which the groups

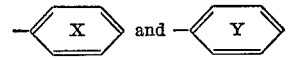

each represent a phenyl or pyridinyl nucleus, $R_1$ and $R_2$ each represent at least one halogen, lower alkyl, halogenoalkyl, acyl, hydroxy, alcoxyl, or acyloxy group, nitrogen radical such as amino or nitro or sulphur radicals, such as thioalkoxy or sulfone, at any positions, on the corresponding nucleus.

A peferred family of anti-inflammatory substances has a general formula

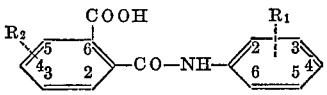

in which $R_1$ represents a 3-methyl; 3-chloro; 4-chloro; 2-trifluoromethyl; 3-trifluormethyl; or 3-methoxy radical; or 2-methoxy 4-chloro; 2,3-dimethyl; or 2,6-dimethyl radicals; and $R_2$ represents hydrogen or, when $R_1$ represents a 3-chloro group, a 3-nitro radical.

It is naturally understood that the index which follows the identification of the radical denotes its position on the corresponding ring.

Other preferred anti-inflammatory substances are also constituted by the 2,3 dimethyl anilide of quinolinic acid and by the 3-pyridine analine of phthalic acid.

The invention relates also to a method for the preparation of these substances, which method consists in reacting the internal anhydride of phthalic or quinolinic acid with aniline, or if necessary the corresponding substituted aniline.

The invention will in any case, be more fully understood by means of the supplementary description and examples which follow, which supplement and examples are of course, given purely by way of illustrative but nonlimiting example. It will be noted that there is sometimes used in the following, with respect to the examples, arbitrary designations (comprising the letters MP followed by a number) to identify them more rapidly, when describing, in the following, certain of the pharmacological results to which they have given rise.

EXAMPLE 1

Preparation of 2,6-dimethyl anilide of phthalic acid (MP 12).

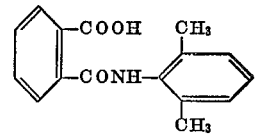

There is dissolved in a cold 14.8 g. (0.1 mole) phthalic anhydride in 80 ml. of methylene chloride. After filtration, there is added to the mixture 12.1 g. (0.1 mole) of 2,6-dimethyl aniline diluted in an equal volume of methylene chloride.

The precipitate formed is rapidly decanted. It is left to stand over night then filtered and recrystallized in 270 ml. of isopropylic alcohol. The anilide crystallizes in a form of white crystals which are filtered and dried.

The 14 g. (0.0526 mole) of the product obtained are introduced into a conical flask and there is added thereto potassium bicarbonate (0.0526 mole+10%) dissolved in a quantity of water equal twenty time this weight. It is stirred for ½ hour and filtered. The filtrate is poured into a solution of hydrochloric acid. A white precipitate is formed which is filtered and dried.

The above-said anilide is obtained with a yield of 48%. It is soluble with heating in ethanol and isopropyl alcohol, and insoluble in chloroform.

Analysis.—$C_{16}H_{15}O_3N$: Calculated (percent): C, 71.36; H, 5.61; N, 5.20. Found (percent): C, 71.30; H, 5.65; N, 5.05. M.P.: 178±1° C.

EXAMPLE 2

Preparation of 3-trifluoromethyl anilide of phthalic acid (MP 13).

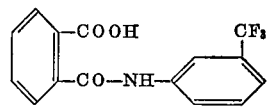

There is dissolved in a cold 11.8 g. (0.08 mole) of phthalic anhydride in 70 ml. of methylene chloride and the mixture filtered. There is added to the mixture 12.9 g. (0.08 mole) of trifluoromethylaniline diluted in an equal volume of methylene chloride. The precipitate formed is decanted rapidly. It is left over night, then filtered and recrystallized in butanol. The anilide precipitates in the form of fine white needles which are filtered and dried.

16 g. (0.051 mole) are introduced into a conical flask and potassium bicarbonate (0.051 mole +10%) is added dissolved in 20 times its weight of water. It is stirred for ½ hour then filtered. The filtrate is poured into a hydrochloric acid. A white precipitate is formed which is filtered and dried.

The above said anilide is obtained with a yield of 33%. It is soluble in hot ethanol and in butanol, and soluble in chloroform. F:183±1° C.

EXAMPLE 3

Preparation of, 2,3 dimethyl anilide of phthalic acid (M.P. 14).

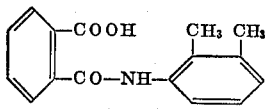

11.8 g. (0.08 mole) of phthalic anhydride are dissolved in the cold in 70 ml. of methylene chloride and the mixture filtered. There is added to the mixture 9.69 g. (0.08 mole) of 2,3-dimethyl anilide diluted in an equal volume of methylene chloride. The precipitate formed is rapidly decanted. It is left over night, then filtered and recrystallized in acetone. The anilide precipitates in the form of white crystals which are filtered and dried. 7 g. of the product obtained are introduced (0.027 mole) in a conical flask then there is added thereto potassium bicarbonate (0.027 ml.+10%) dissolved in twenty times its weight of water. It is stirred for ½ hour, then filtered. The filtrate is poured into a solution of hydrochloric acid. It forms a white precipitate which is filtered and dried.

The above-said anilide is obtained with a yield of 17%. It is soluble with heating in ethanol, butanol and acetone, and insoluble in chloroform.

*Analysis.*—$C_{16}H_5O_3N$: Calculated (percent): C, 71.36; H, 5.61; N, 5.20. Found (percent): C, 71.47; H, 5.65; N, 5.07. Melting point F:175±1° C.

EXAMPLE 4

Preparation of other anilides substituted or not of phthalic or of quinolinic acid.

They are obtained by the method described in Example 2 by reacting phthalic anhydride, if necessary substituted, or quinolinic anhydride with aniline, if necessary substituted correspondingly.

There was thus obtained:

4-methyl anilide of phthalic acid (MP 17)
  F=153±1° C.
2-methyl anilide of phthalic acid (MP 18)
  F=163±1° C.
4-chloro anilide of phthalic acid (MP 19)
  F=170±1° C.
3-chloro anilide of phthalic acid (MP 20)
  F=162±1° C.
3-hydroxy anilide of phthalic acid (MP 21)
  F=215±1° C.
3-methyl anilide of phthalic acid (MP 22)
  F=150±1° C.
2-chloro anilide of phthalic acid (MP 23)
  F=140±1° C.
anilide of phthalic acid (MP 24) F=152±1° C.
4-hydroxy anilide of phthalic acid (MP 25) F=208° C.
2-hydroxy anilide of phthalic acid (MP 26)
  F=214±1° C.
2-trifluoromethyl anilide of phthalic acid (MP 32)
  F=153±1° C.
3-trifluoromethyl anilide of phthalic acid (MP 13)
  F=240±1° C.
3-methoxy anilide of phthalic acid (MP 35) F=162° C.
4-methoxy anilide of phthalic acid (MP 34) F=154° C.
2,5-dimethoxy anilide of phthalic acid (MP 36)
  F=232±1° C.
2-methoxy anilide of phthalic acid (MP 37) F=174° C.
3,4-dimethoxy anilide of phthalic acid (MP 38)
  F=206±1° C.
4-chloro-2-methoxy anilide of phthalic acid (MP 39)
  F=170° C.
2,3-dimethyl anilide of quinolinic acid (MP 40)
  F=148±1° C.
chloro anilide of 3-nitro phthalic acid (MP 41)
  F=177±1° C.
m-pyridine anilide of phthalic acid (MP 42)
  F=191±1° C.

The new monoamides of cyclic diacids, especially of phthalic acid, are characterized by extremely important therapeutic properties and are, at the doses useful in therapeutics, entirely devoid of toxicity.

The lethal doses 50 ($LD_{50}$) per os, determined in the male mouse according to the method of J. T. Litchfield and F. Wilcoxon (J. Pharm. Exp. Ther. 1949–96:99–113) are, for the substances of Examples 1 to 3, of the order of:

4,500 mg./kg. for the substance MP 12
950 mg./kg. for the substance MP 13
1,450 mg./kg. for the substance MP 14

The substances according to the invention are characterized by analgesic and anti-inflammatory activities which have been established by various pharmacological experiments.

The analgesic properties of the substances have in particular been established by the method of Randall and Selitto (Arch. Int. Pharmacodyn. 1957, CXI:409–419) based on the lowering by inflammation of the threshold of sensitivity to pain and its raising by analgesics in the rat.

The inflammation is obtained by injection, under plantar aponeurosis of one of the hind paws, of 0.1 ml. of a 20% aqueous suspension of beer barm. The pain is caused by a force applied on a plantar surface and gradually increased by 16 grams/second: the pain threshold is estimated by the force necessary and sufficient to release a characteristic withdrawal reaction of the paw.

The sensitivity to pain of the inflamed paw reaches a plateau one to two hours after the injection of beer barm and then remains stable for several hours in the control animals whose pain threshold is reached for pressures two to three times less than initially, that is to say for an intact paw. The experimental conditions adopted were the following:

injection of beer barm in one of the hind paws,
measurement, three hours later, of the pain threshold of the inflamed paw in order to check the homogeneity of the pain threshold in the experimental animals,
simultaneously, administration by the oral route of the products under study,
measurement of the threshold pressures 30, 60, 120 and 180 minutes after treatment.

This study was carried out in rats of 130 grams, distributed at random in groups of 9 to 10 animals. The doses used are shown in the table of results. In all these tests, the products were administrated by the oral route in suspension in a 10% aqueous solution of Sénégal gum.

Two series of experiments were effected, one with substances MP 12 and MP 13, the other with the substance MP 14. In one of the series, one of the groups of animals received doses of a known analgesic (amidopyrine), another (control animals) receiving only 10% aqueous solution of the gum Sénégal.

The results obtained in these two series are collected in Tables I and II which follow.

These tables are shown (in the half-columns 1) the average values of the differences between the threshold pressures observed in the rats of a same group before treatment and those determined 30', 60', 120', or 180' after the end of the treatment, according to the column concerned, and (in the half-column 2) the corresponding average percentage variations. "N" represents the number of animals contained in each of the experimental groups.

nicon Mono" with an automatic program; the inclusion in a bloc of paraffin is done by means of an apparatus known under the name "Lab-Teck" Paraffin Dispenser"; the sections of $5\mu$ are made on an apparatus known under the designation of "Minot Microtome" then stained according to the Masson trichromic technique.

TABLE I

| Series doses (mg./kg.) | +30 min. | | +60 min. | | +120 min. | | +180 min. | |
|---|---|---|---|---|---|---|---|---|
| | 1 | 2 | 1 | 2 | 1 | 2 | 1 | 2 |
| Control: | | | | | | | | |
| N=10 | 48 | | 52 | | 57 | | 53 | |
| Amidopyrine: | | | | | | | | |
| (60) N=9 | 87 | +81 | 104 | +100 | 103 | +81 | 110 | +107 |
| MP 12: | | | | | | | | |
| (30) N=10 | 77 | +60 | 83 | +60 | 94 | +65 | 91 | +73 |
| (60) N=9 | 70 | +46 | 85 | +63 | 83 | +46 | 83 | +57 |
| (90) N=10 | 74 | +54 | 78 | +50 | 74 | +30 | 75 | +41 |
| MP 13: | | | | | | | | |
| (30) N=10 | 76 | +58 | 76 | +46 | 75 | +31 | 76 | +43 |
| (60) N=9 | 83 | +73 | 89 | +71 | 89 | +56 | 83 | +57 |
| (90) N=9 | 79 | +64 | 84 | +61 | 90 | +58 | 93 | +75 |

TABLE II

| Series doses (mg./kg.) | +30 min. | | +60 min. | | +120 min. | | +180 min. | |
|---|---|---|---|---|---|---|---|---|
| | 1 | 2 | 1 | 2 | 1 | 2 | 1 | 2 |
| Control: | | | | | | | | |
| N=10 | 65 | | 72 | | 73 | | 75 | |
| (30) N=10 | 95 | +46.1 | 99 | +37.5 | 97 | +32.9 | 96 | +28.0 |
| (60) N=10 | 90 | +38.5 | 97 | +34.7 | 98 | +34.2 | 98 | +30.7 |
| (90) N=10 | 95 | +46.1 | 102 | +41.7 | 102 | +39.7 | 100 | +33.3 |

The substances studied have hence, all three, as emerges from the above tables, a considerable and lasting analgesic activity. The substances MP 12 and MP 13, in particular, have an activity of the same order of magnitude as that of amidopyrine, well known analgesic whose use is widespread in therapeutic.

The substances according to the invention have, not only an analgesic activity with regard to pains caused by inflammation of the tissue, as demonstrated by the Randall and Selitto test, but also an action with respect to the inflammatory process itself, which action, for a large number of them, is particularly important.

This anti-inflammatory effect can be established by the "terebenthine micro-abscess test" which has enabled the study of the substances according to the invention (compared with that of the anti-inflammatory medicament known under the name of "butazolidine") on the histological structure on this micro-abcess in the white rat, more particularly of the inflammatory granuloma surrounding this micro-abscess. This granuloma, of course includes a reticulo-histocytic and fibroblastic barrier forming a shell of fibrils and of fibers or of collagenic blocs around a necrotic center; this barrier is permeabilized by neovessels of which the arrangement is radial towards the necrotic center: at the periphery, an interstitial foamy oedema is often observed.

The above-said test has been established in groups each comprising 10 white rats of average weight 150 grams. After careful shaving and disinfection of the skin with alcohol, the animals receive in the supero-internal portion of the lumbar region a subcutaneous injection of rectified essence of terebenthine in a volume of 0.2 ml. This injection is effected under ether anesthesia. The animals which must receive treatment are treated two hours after awakening from anasthesia. The treatment is continued for 5 days and all the substances were administrated by the oral route in daily doses which are shown particularly in the left hand column given in Table III below. The animals are sacrificed under anasthesia 24 hours after the last treatment. The granuloma formed are removed and carefully dissected, then placed in an aqueous Bouin solution; the fixing and dehydration of the tissue are ensured by an apparatus known under the designation "Tech- There results from Table III below, in which have been collected the results obtained in these tests with certain of the substances according to the invention, that the latter, just as butazolidine, produce a reduction in the volume of the necrotic center created by the terebenthine abcess and inhibit, without however completely eliminating, the growth of the different elements which come into play in the anabolic phase of the repair of conjunctive tissue and which, in the anti-inflammatory processes tend to be over-developed. These elements are, just as the necrotic center and the number of neovessels formed in the granuloma, quoted in Table III by means of average indices, as a function of their respective importances.

TABLE III

| Series doses (mg./kg.) | Necrosis | Reticulohistocytes | Fibroblasts | Fibrils of collagen | Fibres of collagen F | New vessels |
|---|---|---|---|---|---|---|
| Control I: | | | | | | |
| N=8 | 1.70 | 1.00 | 1.81 | 1.37 | 0.94 | 1.87 |
| Butazolidine: | | | | | | |
| 90 | 1.45 | 0.60 | 1.00 | 0.35 | 0.55 | 1.95 |
| MP 12: | | | | | | |
| 30 | 1.65 | 0.70 | 0.90 | 0.55 | 1.05 | 1.75 |
| 60 | 1.35 | 0.65 | 0.70 | 0.40 | 0.65 | 1.70 |
| 90 | 1.50 | 0.60 | 0.90 | 0.75 | 0.55 | 2.00 |
| MP 13: | | | | | | |
| 30 | 1.30 | 0.60 | 0.60 | 0.55 | 0.35 | 1.75 |
| 60 | 1.40 | 0.50 | 0.70 | 0.50 | 0.30 | 1.90 |
| MP 14: | | | | | | |
| 30 | 1.60 | 0.60 | 0.90 | 0.65 | 0.90 | 2.20 |
| 60 | 1.50 | 0.60 | 0.75 | 0.70 | 0.90 | 2.05 |
| 90 | 1.70 | 0.65 | 0.95 | 0.65 | 0.80 | 1.95 |

It results from this table that the substances MP 12, MP 13 and MP 14 exert a very distinct anti-inflammatory activity. The substance MP 13 even exerts an anti-inflammatory activity at least as great as that of butazolidine. The substances according to the invention, due to the fact that they also do not entirely inhibit the growth of the reticulohistocytes, the fibroblasts and the collagen hence also exert a regulatory action at the time of the reconstitution of the conjunctive tissue around the necrotic center and, through this fact, favor healthy cicatrisation.

The anti-inflammatory action of the substances according to the invention, especially the substance MP 13, has also been able to be established at the level of the oedematous phase of inflammation, especially in the "carragenin oedema" tests (Winter and Coll., Proc. Soc. Exp. Biol. N.Y. 1962, 111: 544) and the "histamine oedema" tests in the rat.

It has been observed especially that the injection of a suspension containing one or other of the above-mentioned irritant agents under plantar aponeurosis produces oedemas of distinctly less importance in rats which had received daily doses, especially of 60 mg./kg. of the substance MP 13, than in the untreated control rats subjected to the same tests.

This anti-inflammatory activity has also been particularly established, for a large number of substances according to the invention, but the carragenin micro-abscess test according to the technique of Benitz and Hall (Arch. Int. Pharmacodyn., 1963, 144, 1 and 2: 185–195) applied to the male rat.

The formation of the abscess is, in this technique, caused by subcutaneous injection, in the carefully shaved dorsal region of 0.50 ml. of a freshly prepared 2% solution of carragenin (Gelozoine STI) in distilled water. The products under study are administered by the gastric route in two lots (at the moment of the injection of the carragenin and 6 hours later), their action being judged by comparison with animals studied simultaneously and not receiving, within the same periods, the solvent (10% aqueous solution of Senegal gum).

Twenty-four hours after the injection of carragenin the animals are sacrificed with ether; the abscesses are removed, carefully dissected and immediately weighed to the nearest milligram. Certain abscesses of the series treated and those of the corresponding "control" rats are then placed in an oven at 110° C. for drying; the latter is continued until constant weights are obtained which are noted.

The average percentage variation of the weight of the abscesses, fresh or dry, in the series treated with respect to the corresponding "control" series is calculated; there is also noted the number of rats treated of which the weight of abscess is less than 30% at least than the average weight of the abscesses in the corresponding "control" animals.

There is reported in Tables IV and V below the results obtained with both of the products whose active dose 50 (AD 50) is less than 2000 mg./kg. or of the same order of magnitude. There is understood by AD 50 the dose of product necessary to produce a reduction of 50% of the average weight of the abscesses caused by carragenin, compared with the average weight of the abcesses caused in the control series. None of the substances is toxic at this dose of 2000 mg./kg.

In each of these tables there appear:

in the first column, the products examined, identified by their chemical names and by their arbitrary designations;

in the second column, the doses of the product (mg./kg.) used and administered per os (the zero doses correspond obviously in each field to the control animals);

in the third column, the numbers (N) of rats treated with each of the doses.

in the fourth column, the average weights (P) of the fresh abscesses brought to 100 for the control animals (being understood that in fact the actual weights were, according to the experimental series, of the order of 2800 to 3300 mg.) and in the same proportions for the treated animals;

in the fifth column the percentage (%) of rats "protected," that is to say of those of which the abscesses have an average weight less than at least 30% of the "control" animals;

in the sixth column, the AD 50 when they have been determinable,

TABLE IV

| Series | Mg./kg. | N | P Percent | AD 50, mg./kg. |
|---|---|---|---|---|
| 2-trifluoromethyl anilide of phthalic acid MP 32. | 0 | 30 | 100 | |
| | 500 | 30 | 66.5 | 66.6 |
| 3-trifluoromethyl anilide of phthalic acid MP 13. | 0 | 72 | 100 | |
| | 500 | 48 | 74 | 58 |
| | 0 | 30 | 100 | |
| | 500 | 30 | 86 | 27 |
| 3-methyl anilide of phthalic acid MP 22. | 0 | 60 | 100 | |
| | 500 | 12 | 92 | 0 |
| | 1,000 | 12 | 88 | 8.3 |
| | 1,500 | 12 | 70 | 41.6 | 2,250. |
| | 2,000 | 12 | 75 | 41.6 |
| | 2,500 | 12 | 76 | 50.0 |
| | 3,000 | 12 | 68 | 66.6 |
| 3-chloro anilide of phthalic acid MP 20. | 0 | 48 | 100 | |
| | 250 | 24 | 88 | 12.50 |
| | 375 | 24 | 81 | 41.66 |
| | 500 | 24 | 54 | 66.66 | 425. |
| | 750 | 24 | 51 | 87.50 |
| | 1,000 | 24 | 65 | 75.00 |
| 4-chloro anilide of phthalic acid MP 19. | 0 | 30 | 100 | |
| | 500 | 30 | 68.4 | 60 |
| 3-chloro anilide of 3-nitro phthalic acid MP 41. | 0 | 48 | 100 | |
| | 125 | 12 | 97 | 0 | Bet'n 1,000 |
| | 250 | 12 | 90 | 41.6 | and |
| | 500 | 12 | 78 | 41.6 | 2,000. |
| | 1,000 | 12 | 77 | 50.0 |
| | 2,000 | 12 | 71 | 50.0 |

TABLE V

| Series | Mg./kg. | N | P Percent | AD 50, mg./kg. |
|---|---|---|---|---|
| 2-methoxy 4-chloroanilide of phthalic acid, MP 39. | 0 | 60 | 100 | |
| | 250 | 12 | 78 | 25.0 |
| | 500 | 12 | 73 | 33.3 |
| | 750 | 12 | 78 | 50.0 | 650. |
| | 1,000 | 12 | 56 | 75.0 |
| | 1,250 | 12 | 74 | 66.6 |
| | 1,500 | 12 | 44 | 100.0 |
| 3-methoxy anilide of phthalic acid, MP 35. | 0 | 60 | 100 | |
| | 500 | 12 | 83 | 8.3 |
| | 750 | 12 | 72 | 66.6 | 975. |
| | 1,000 | 12 | 72 | 58.3 |
| | 1,500 | 12 | 78 | 50.0 |
| | 2,000 | 12 | 52 | 83.3 |
| 4-methoxy anilide of phthalic acid, MP 34. | 0 | 36 | 100 | |
| | 500 | 12 | 82 | 25.0 | About 2,000. |
| | 1,000 | 12 | 75 | 25.0 |
| | 2,000 | 12 | 80 | 58.3 |
| 3,4-dimethoxy anilide of phthalic acid, MP 38. | 0 | 48 | 100 | |
| | 500 | 12 | 98 | 8.3 | About 2,000. |
| | 1,000 | 12 | 73 | 41.6 |
| | 1,500 | 12 | 91 | 25.0 |
| | 2,000 | 12 | 75 | 58.3 |
| 2,3-dimenthyl anilide of quinolinic acid, MP 40. | 0 | 36 | 100 | |
| | 250 | 12 | 93 | 25.0 | About 2,000. |
| | 500 | 12 | 75 | 41.6 |
| | 750 | 12 | 83 | 41.6 |
| | 1,000 | 12 | 75 | 50.0 |
| M-pyridine anilide of phthalic acid, MP 42. | 0 | 36 | 100 | |
| | 250 | 12 | 89 | 8.3 | Bet'n 1,000 |
| | 500 | 12 | 74 | 33.3 | and |
| | 1,000 | 12 | 79 | 41.6 | 2,000. |
| | 2,000 | 12 | 64 | 58.3 |

It is self evident that the anti-inflammatory activity of the experimental products is all the greater as, for a given dose of product, the average weight P of the abscesses and the AD 50 are smaller and the percentages of rats protected higher.

From examination of these tables, it emerges that substitution at the 3-position of the anilide is mostly favorable to activity. This observation is of course in no way limiting being given that one of the most active products, namely MP 39, is a 2-methoxy-4-chloro anilide of phthalic acid.

The anti-inflammatory activity persists when there is produced a substitution of the phthalic nucleus (MP 41) or when the phenyl nucleus of the anilide group is replaced by a pyridinyl group (MP 42).

It will also be noted that the inhibitor action on inflammation exerted by the substances according to the invention does not bear essentially on the liquidien phenomena of inflammation. It relates also to the tissular proliferation generated by the carragenin inflammation, and as emerges particularly from Table VI below in which there are reported the average percentage reductions of the average weights in the fresh abscesses as well as of the abscesses after desiccation, with respect to the control animals, in rats which have been treated with products MP 20 and MP 22.

TABLE VI

| Compounds | Doses (mg./kg.) p.o. | Percentage variation of average weight of abscesses | |
|---|---|---|---|
| | | Fresh | Dry |
| MP 20 | 375 | −19 | −10.69 |
| | 500 | −46 | −39.91 |
| | 750 | −49 | −55.14 |
| | 1,000 | −35 | −32.92 |
| MP 22 | 1,500 | −30 | −23.86 |
| | 2,000 | −25 | −31.93 |
| | 2,500 | −24 | −25.10 |
| | 3,000 | −32 | −22.97 |

The substances according to the invention are besides revealed to have a reduced ulcerigenic activity, especially of compared with that of known anti-inflammatories such as phenylbutazone. This slow ulcerigenic activity has particularly been demonstrated for a certain number of the substances according to the invention by the following tests.

In a certain number of rats treated under the above conditions there are, at the moment of sacrifice, removed and examined with a Leitz binocular lens, the stomach and the intestines to study and possibly to note macroscopically the effects caused by the products under study. The same experiments were carried out in rats which have been treated with phenylbutazone. The results appear in Table VII below in which there are reported for each series:

the number of rats suffering from intestinal and/or gastric disorders, being understood that there are considered as gastric disorder any macroscopic modification reaching at least the gravity of an ulcerous scar (index $n=3$);

"the average index of overall disorder" (IMAG) obtained by effecting the sum of the notations corresponding to each disorder shown by the stomach of each of the rats affected, by adding the individual sums and by dividing the total by the number of rats affected, this index enabling the gravity of the syndrome of gastric lesions to be evaluated in those of the animals which have a particular susceptibility with regard to the product under study; the above-said disorders of each stomach have been noted as follows:

```
                                    0=nothing to report.
                                    1=oedema—severe epithelial des-
Separately for the rumen and         quamation—purpura—hyperhe-
  glandular portion                  mia.
                                    2=hemorrhagias.
                                    3=an ulcerous scar.
                                    4=two to four ulcerous scars.
                                    5=more than four ulcerous scars.
                                    6=one ulceration.
Only on the glandular portions      7=two to four ulcerations.
                                    8=more than four ulcerations.
                                    9=perforation.
```

TABLE VII

| Compounds | Doses, mg./kg. | Number of rats in the experiment N | Stomach | |
|---|---|---|---|---|
| | | | Number of rats affected N' | Average index of overall disorder: IMAG |
| Phenylbutazone | 200 | 12 | 3 | 4.50 |
| | 400 | 12 | 7 | 8.91 |
| MP 13 | 800 | 12 | 2 | 3.16 |
| | 1,200 | 11 | 3 | 5.09 |
| MP 20 | 1,000 | 12 | 5 | 5.41 |
| MP 22 | 2,500 | 12 | 2 | 6.09 |
| | 3,000 | 12 | 3 | 6.91 |
| MP 24 | 1,000 | 12 | 4 | 4.58 |

This table shows the fact that at much higher doses the substances according to the invention are less ulcerigenic than phenylbutazone. At the doses where the products according to the invention—at least as regards the most active among them—act efficaciously, they only show a slight, even no, ulcerigenic character.

This is particularly the case for products MP 13 and MP 20 of which the AD 50 (respectively 440 and 425) are distinctly less at the lowest doses considered in the table above.

At lower doses (especially lower than those used in the tests of Randall and Selitto on one hand, and in those of the "terebenthine microabscess" on the other hand which have been described above), the substances according to the invention, and more particularly the products MP 12, MP 13 and MP 14, are entirely devoid of ulcerigenic effect. It has not then been possible to reveal the formation of ulcers attributable to the experimental substances in the stomach of the animals, which had been removed for this purpose in the animals subjected to these latter tests. On the contrary it even appeared that one of the substances according to the invention could exert an antiulcer action which makes it suitable for the treatment of this type of disorder. Such is the case for the substance MP 12 (2.6-dimethyl anilide of phthalic acid).

The antiulcer activity of this substance has been established especially by the study of its preventive effect with regard to gastric ulcers caused in the rat by pylorus ligature according to the method of Shay (Gastroenterology, 1945, 5: 43).

Male white rats of the same origin weighing between 140 and 150 grams divided into various groups (comprising respectively the numbers of rats indicated in the table VIII below, in column "N"), which have respectively received daily doses of 30, 60 and 90 mg. of the substance MP 12 in suspension in a 10% aqueous solution of Senegal gum, and this from the beginning to the end of the treatment described by Shay and of which the principal stages are described below, the group of "control rats" having received only the Senegal gum solution, under the same conditions.

The animals have, in the course of this treatment, been placed on a hydric diet for 48 hours, the animals being isolated during this period. The pylorus of each of these animals was then ligatured under anasthesia with ether according to the methods described by the author already cited; the abdominal wall was closed and the animal again isolated for the 8 hours following. At the end of this time, the animals were sacrificed by anasthesia with ether and the stomachs carefully removed after placing a ligature on the heart. The gastric contents were collected in their entirety and centrifuged in order to determine the volume of gastric juice collected during these 8 hours. The stomachs were then cut along with the large curve, arranged on a plate of cardboard and fixed for 48 hours in 10% formaldehyde, for the purpose of disclosing ulcerations possibly produced in each of the animals by the above-said treatment.

The results indicated in Table VIII below show the protective action exerted by the substance MP 12 in those of the animals which have received active doses of this substance, for comparison with the results obtained in the control animals.

There are shown in this Table VIII:
the number "N" of rats contained in each of the groups;
the number "NU" of rats in each group having a gastric ulceration, whatever the gravity of the latter;
the sum of the indexes of ulceration "$\epsilon U$" of the rats in each of the groups considered, taking into account that the ulcerations undergone by the rats of each of the groups when they have been discernable, were quoted from 0 to 5 according to their number and their gravity;
the index $$IU = \frac{100 \times \epsilon U}{5N}$$

which provides a measure of the average gravity of the anatomic affliction observed in each of the groups (5N representing the theoretical maximal sum of the ulceration indexes);

the UI index $$\frac{\epsilon U \times NU}{N \times N}$$

which supplies a measure of the degree of total protection exerted by the substances tested, this index taking into account the number of animals of each of the groups which have not undergone any ulceration and, finally, the average hourly volume of gastric juice formed in the animals of each of the groups in the last part of the treatment described above for the 8 hours preceeding the sacrifice of the animal by ether anesthesia, this average hourly volume representing one eights of the volume of liquid collected by the end of these 8 hours.

TABLE VIII

| Series | Doses, mg./kg. | N | Ulcers | | | | Gastric juice hourly volume |
|---|---|---|---|---|---|---|---|
| | | | NU | εU | IU | UI | |
| Controls | | 69 | 69 | 184 | 53.3 | 2.66 | 0.97±0.037 |
| MP 12 | 30 | 10 | 10 | 25 | 50.0 | 2.50 | 0.94±0.060 |
| | 60 | 16 | 13 | 37 | 46.2 | 1.88 | 0.93±0.092 |
| | 90 | 9 | 7 | 18 | 40.0 | 1.55 | 1.07±0.115 |

As emerges from Table VIII the compound MP 12 exerted an antiulcer effect which becomes considerable in those of the rats which had received daily 90 mg./kg., which effect is manifested by a reduction by 25% of the IU index and the reduction by 42% of the UI index with respect to the values of the corresponding indexes determined in the control animals.

The greatest reduction in UI index is therefore manifested by the ability of the substance to exert an effective protection action on the stomach with regard to ulcers, when it is administered to the patient in sufficient active doses.

This substance appears in addition to be devoid of undesirable effects, especially anticholinergic, as emerges from the volumes of the gastric secretion appearing in the last column of Table VIII, which volumes do not have significant variations from one group of rats to the other.

As emerges from the preceding description, the substances according to the invention show themselves to be agents which are analgesic, antiphlogistic, and anti-inflammatory, especially at the level of the collagen fibers, and—as regards the product MP 12—antiulcerigenics of great value, these properties which are to be found simultaneously in the product MP 12 are all the more interesting since they are not generally found compatible in known medicaments for each of these indications.

These substances could be used, for example, for the treatment of neuralgis, inflammatory rheumatisms of the arthritic or arthrosis type. The substance MP 12 will also be useful for the treatment of ulcers, gastritis, duodenitis or be used in preventive manner, for example, for the purpose of ensuring the protection of the subject with regard to ulcers capable of appearing in certain hormone treatments.

The substances according to the invention can be administered preferably by the oral route in all the conventional forms in use for this method of adiministration.

The daily doses capable of being administered to patients affected with disorders of the inflammatory type are of the order of 200 to 1000 mq., preferably from 400 to 800 mg., of one of the substances according to the invention.

The daily doses of 2,6-dimethyl anilide of phthalic acid (MP 12) which can be administered to patients suffering from disorders of the type of ulcers, gastritis, duodenitis are of the order of 200 to 1000 mg.

There have been thus constituted tablets containing the substances by way of active principle and having the following composition (per tablet):

Active substances: 100 mg.
Excipient by compression: sugar (2 parts); kaolin (1 part): talc (2 parts); q.s.p. 0.25 g.

The tablets of this type, based especially on substances MP 12 and MP 13, have been used with success in the treatment of clinical cases which will be given below by way of nonlimiting illustration of the invention.

Monsier R . . ., 42 years, suffering from scapulohumeral arthritis limiting the mobility of articulation and preventing him from combing, shaving, this arthritis being manifested by spontaneous pains of articulation as well as on pressure and on movement, was treated with the tablets of 100 mg. of the substance MP 13. On the third day of the treatment of six tablets per day, there was observed a disappearance of the spontaneous pains on palpation, and the recovery of 50% of the ability of movement of the articulation. On the ninth day, there still persisted only a slight limitation of retro-posterior movements.

Monsieur N . . ., 56 years, suffering from gastric ulcers, especially of a fold at the lower bend of the large curve, was treated with the tablets dosed at 100 mg. of the substance MP 12. This treatment comprised eight tablets per day for the first ten days, six tablets for the following ten days and four tablets for the last ten days. A clinical improvement was observed with suppression of pain from the tenth day. This cicatrisation of these ulcers on the 30th day was confirmed by radiographic examination.

As it is self-evident and as results already besides from the preceding description, the invention is in no way limited to those of its method of application, nor to those of its methods of production of its various parts, which have been more particularly indicated; it embraces, on the contrary, all variations.

We claim:

1. An orally administrable pharmaceutical composition for the treatment or prevention of gastric or duodenal ulcers in a patient in the form of a tablet, comprising an effective amount for the prevention of gastric or duodenal ulcers of

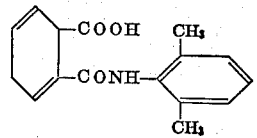

or a pharmaceutically acceptable salt thereof and an excipient.

2. The pharmaceutical composition of claim 1 in dosage unit form comprising 100 mg. to 1000 mg. of

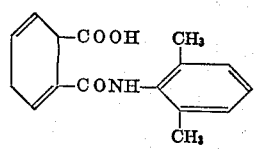

per dosage unit and an excipient.

3. A method for the treatment or prevention of gastric or duodenal ulcers in a patient comprising administrating to the patient an effective amount for the treatment or prevention of gastric or duodenal ulcers of

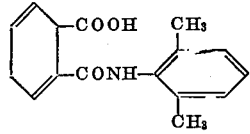

4. A method according to claim 3 which comprises administrating to the patients

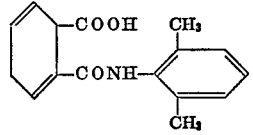

in amounts ranging from about 200 to 1000 mg. per day.

References Cited

Chemical Abstracts 56: 2375h (1962).

JEROME D. GOLDBERG, Primary Examiner